Feb. 28, 1933.  R. N. EARLY  1,899,797
DYNAMO ELECTRIC MACHINE
Filed Jan. 25, 1929  4 Sheets-Sheet 1

INVENTOR
Rupert N. Early
BY
ATTORNEYS

Patented Feb. 28, 1933

1,899,797

UNITED STATES PATENT OFFICE

RUPERT N. EARLY, OF MINNEAPOLIS, MINNESOTA, ASSIGNOR TO ELECTRIC MACHINERY MANUFACTURING COMPANY, OF MINNEAPOLIS, MINNESOTA

DYNAMO-ELECTRIC MACHINE

Application filed January 25, 1929. Serial No. 334,881.

This invention relates to electric motors and more particularly to improvements in induction motors and synchronous motors and in methods of starting such motors.

It is an object of this invention to eliminate the necessity of providing some means external to an electric motor, such as the ordinary autotransformer, for cutting down the voltage applied to the primary winding during the starting period. In accordance with present practice it is usually desirable and oftentimes essential to provide some means for reducing the voltage applied to the terminals of the motor, at least until the motor has attained a considerable speed, and this for the reason that unless some such expedient is employed, the current taken by the motor will be excessive and may cause injury to the motor and an undesirable surge on the line.

In general the present invention contemplates a temporary change in the organization of the primary of the motor whereby the impedance of the active primary circuit is increased, thereby limiting the flow of current in the primary circuit to a safe value without employing any external means for reducing the voltage applied to the motor terminals.

This invention contemplates the provision of a primary winding comprising at least two winding sections which may be connected in parallel during normal operation of the motor but which are adapted to be arranged in some other relation during starting period in order to limit the flow of current from the line. The primary winding sections are preferably arranged so that the impedance of at least one section may be temporarily increased, as by inserting a resistance or reactance in series with this section, by disconnecting this section from the primary circuit (in which event only the other section or sections are utilized during the starting period), or by connecting at least portions of one or more sections in series with at least portions of another section or sections. Where winding sections are connected in parallel the impedance of this parallel system is necessarily less than that of any one branch of the parallel system when used alone, and accordingly, it is possible to limit the flow of current by interrupting the parallel connection of winding sections normally connected in parallel relation. According to one embodiment of my invention I provide a primary winding comprising two winding sections normally connected in parallel, and means for temporarily disconnecting one section from the other section during a portion of the starting period, thereby limiting the flow of current in the primary circuit. After the motor speed has reached a value such that the counter E. M. F. is of sufficient magnitude to materially oppose the flow of current from the line, the winding sections may be reconnected in parallel without drawing excessive current from the line.

The reactance of a uniformally distributed primary winding is less than that of a concentrated winding and, accordingly, by concentrating the coils of the primary winding it is possible to increase the reactance and thereby limit the flow of current. My invention contemplates this method of increasing the effective reactance as well as other methods of accomplishing this result.

My invention may be utilized by employing manually operable devices for temporarily changing the organization of the primary coils but I prefer to provide automatic means for accomplishing this result, such as means responsive to the electrical condition of a secondary winding or to the slip or speed of the motor.

This invention provides simple and reliable means for starting alternating current motors on full voltage and at the same time limiting the current drawn from the line to a value comparable with that of reduced voltage starting through an autotransformer. It has the important advantage that motor accessories such as autotransformer starters are not required, Furthermore, when using the present invention it is not necessary to disconnect the motor from the line at any time during the accelerating or running period as is the case with ordinary reduced voltage starting, and smoother acceleration is provided without the line disturbances incident to disconnecting the motor from the line as is the case when the transfer from reduced voltage to full voltage is made using the ordinary autotransformer, or the like.

This invention contemplates the use of a primary winding comprising sections normally connected in parallel but which may be reorganized during the starting period as by interrupting the parallel connection and thereby causing all of the primary current to traverse only one branch of the circuit. A resistance or a reactance may be included in series with the branch carrying the primary starting current for the purpose of further reducing the value of this current and if desired one branch of the circuit may be used as a transformer connected across a condenser for improvement of power factor and reduction of KVA.

The various objects and advantages of my invention will be more apparent upon considering the following detailed description and the accompanying drawings in which.

Figure 1:
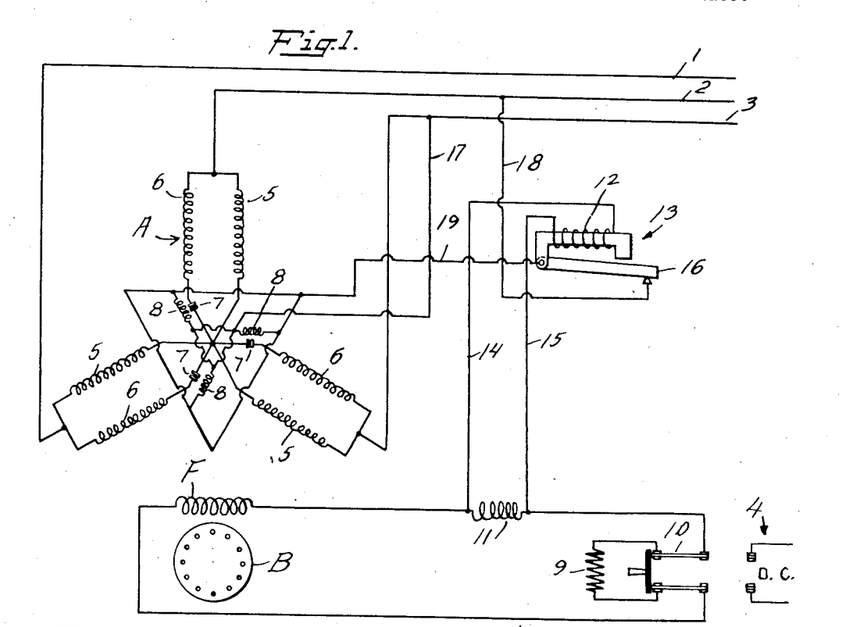
Fig. 1 is a diagrammatic representation of a synchronous motor embodying my invention.

In Fig. 1, I have illustrated a synchronous motor having a three phase star-connected primary winding A, a field winding F, and a squirrel cage or damper winding B. Power is supplied to the primary winding from any suitable source of polyphase alternating current, such as that represented by the supply leads 1, 2 and 3 and direct current may be supplied to the motor field winding F from a suitable source, such as that illustrated at 4.

Each phase of the primary winding A includes two winding sections 5 and 6 adapted to be connected in parallel during normal operation of the motor. During the starting period however the parallel connection of the several winding sections may be interrupted. For example, the winding sections 6 may be temporarily disconnected from the sections 5 by opening the switches 7. With these switches 7 open during the starting period all of the primary current is compelled to flow through the winding sections 5 and these sections offer greater resistance to the flow of current than would be offered by the motor primary if the sections 6 were connected in parallel with the sections 5. In this way the flow of current from the line is greatly reduced and this result is accomplished without using any auxiliary apparatus such as the autotransformers ordinarily used for the purpose of reducing the voltage supplied to the motor terminals. When the motor speed increases to a value such that the counter E. M. F. materially opposes the flow of current in the primary circuit the switches 7 may be closed so as to connect the winding sections 6 in parallel with the sections 5. The closing of the switches 7 will result in a momentary increase in the starting current but the current will never reach excessive proportions because at this stage of the starting period the counter E. M. F. effectively opposes the line voltage to limit the current to a safe value. Under ordinary conditions it is satisfactory to close the switches 7 when the motor has attained a speed approximately 80 per cent synchronous speed, although the particular speed at which the switches should be closed may vary in accordance with varying conditions of operation and varying motor characteristics.

Under certain conditions it is desirable to open all of the switches 7 during the starting period, whereas, under other conditions satisfactory starting may be obtained by opening some but not all of the switches 7. For example, it has been found that with a certain 60 H. P. 3 phase motor satisfactory starting could be obtained using an autotransformer which reduced the starting voltage to 80 per cent of the line voltage. When this motor was started using the present invention and eliminating the autotransformer the accelerating period was somewhat longer when all of the switches controlling the parallel connection of the winding sections were open, whereas, starting conditions approximately the same as those obtained with the autotransformer were obtained when the motor was started with only two of the three switches open during the starting period.

While satisfactory results can be obtained by manual operation of the switches 7 yet I prefer to provide means rendering the operation of these switches automatically responsive to the speed of the motor, to the electrical condition of a secondary winding, or to the slip of the motor. In Fig. 1, I have illustrated operating coils 8 for the switches 7 and I have illustrated automatically operating means for controlling the operation of these electric magnetic switches. I have illustrated the field winding F of the synchronous motor as being normally closed during the starting period through a resistance 9, this closed circuit being established by a switch 10. This same switch may be used for the purpose of connecting the field winding to a source of direct current, such as that illustrated at 4. I have illustrated a reactance 11 in the field circuit and th operating coil 12 of a relay 13 is shown connected across the reactance 11 by means of leads 14 and 15. When the relay armature 16 is in its released position, as illustrated in Fig. 1, current is supplied to the operating coils 8 of the switches 7 from any suitable source, such as the supply leads 2 and 3, the current being supplied to the coils 8 through leads 17, 18 and 19. As soon as voltage is supplied to the primary winding a current of substantially line frequency is induced in the secondary winding F and the presence of the reactance 11 in this secondary circuit causes a considerable portion of the induced current to flow through the operating coil 12 of the relay 13, thus immediately interrupting the connection between the supply leads 2 and 3 and the operating coils 8 of the switches 7. The motor will then accelerate with the switches 7 open until such a time as determined by the adjustment of the relay 15 when the relay armature 16 will be released, thereby closing the circuit including the operating coils 8 of the switches 7. The closing of the switches 7 reconnects the winding sections 6 in parallel with the winding sections 5 and the motor speed will increase to its normal operating value, assuming that the relay 13 has been adjusted to release its armature at a speed below the normal operating speed. As the speed of the motor increases the frequency of the induced current flowing in the field circuit decreases and a greater portion of the secondary current flows through the reactance 11 and a smaller portion through the operating coil 12 of the relay 13 until finally the relay 13 releases its armature. Accordingly, the relay 13 is in a sense responsive to the speed of the motor, it is responsive to the electrical condition of the field winding F, and it is responsive to the slip of the motor for the secondary circuit carries a current of slip frequency during the starting period.

Figure 6:
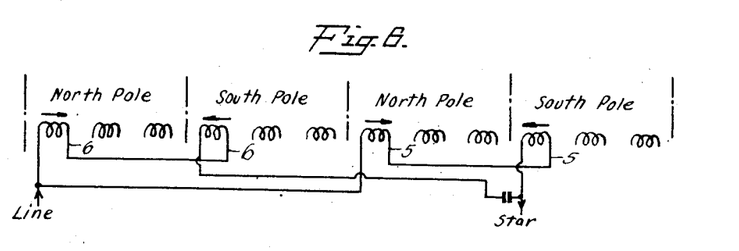
Figs. 6 and 7 are diagrams representing two different arrangements of the primary coils on a motor embodying the invention.
Figure 7:
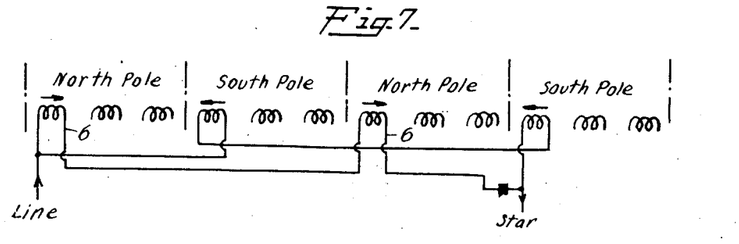

In order to utilize this invention it is not necessary to employ any special arrangement of the primary coils except to provide for the connection of one or more sections in parallel relation with respect to another portion, or other portions, of the primary winding. I prefer however to arrange the primary coils in a manner so as to provide high reactance. For example, by concentrating the coils a higher reactance can be obtained than by using a more uniformly distributed arrangement of the coils. In Fig. 6, I have illustrated the winding sections 6 as being concentrated on alternate pairs of poles with the winding sections 5 located on the intermediate pairs of poles. Where this arrangement is employed the reactance of each winding section is higher than it would be if the sections were more uniformly distributed, as illustrated in Fig. 7 for example where the winding sections 6 are located on alternate poles.

Figure 2:
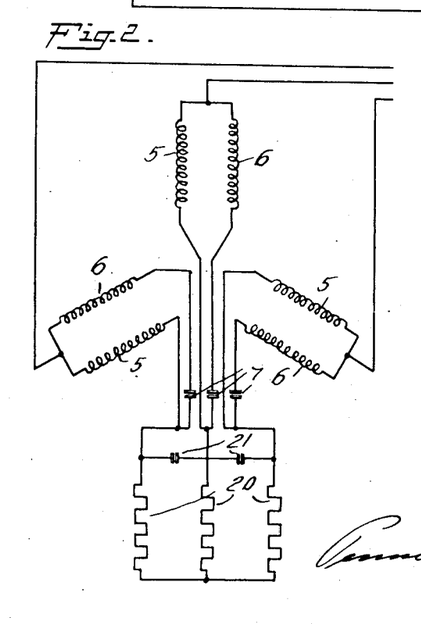
Fig. 2 is a diagrammatc representation of a primary motor circuit embodying the invention.

In Fig. 2, I have illustrated a primary winding similar to that shown in Fig. 1 but with the addition of means for including a resistance in series with the active winding sections during the starting period. In Fig. 2 star-connected resistance elements 20 are arranged in a convenient manner to be included in series with the winding sections 5 when the switches 21 are open. This arrangement is sufficiently flexible to provide a number of steps in the starting process. For example, the motor may be started by first opening switches 7 and 21 and supplying voltage to the winding sections 5. Current then flows through the winding sections 5 and through the resistance elements 20. Thereafter the switches 21 may be closed, thereby eliminating the resistance elements from the primary circuit and finally switches 7 may be closed to connect the winding sections 6 in parallel with the sections 5. As an alternative method of starting the motor illustrated in Fig. 2, the switches 7 and 21 may be first opened and voltage applied to the winding sections 5 until the motor accelerates to the desired extent, whereupon the switches 7 may be closed to connect the winding sections 6 in parallel with sections 5, both sections being then in series with resistance elements 20. After the motor speed approaches the normal operating value the switches 21 may be closed to cut out the resistance elements.

Figure 3:
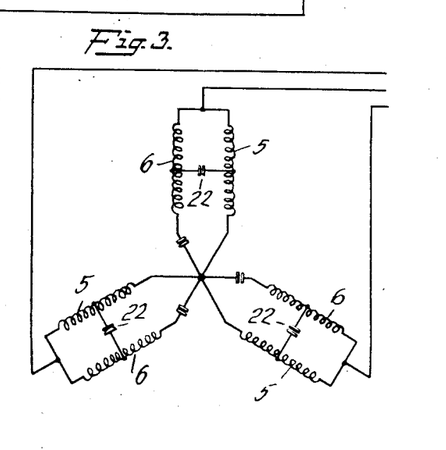
Figs. 3, 4 and 5 are diagrammatic views similar to Fig. 2 illustrating other embodiments of the invention.

In Fig. 3, I have illustrated another embodiment of my invention. This figure shows a primary winding similar to that illustrated in Figs. 1 and 2 but with the addition of means for sectionalizing the winding sections, thus permitting at least a portion of one winding section of each phase to be connected in series with at least a portion of the other winding section of that phase. In Fig. 3, I have provided switches 22 connected to the winding sections 5 and 6 at points intermediate their ends and it will be understood that these switches may be employed at some stage or stages during the starting operation to connect portions of each winding section of one or more phases in series with the remaining portion of one of said sections.

Figure 4:
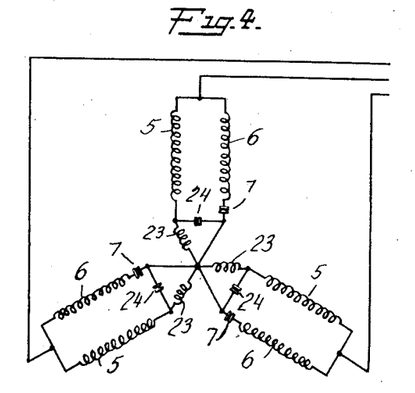

The embodiment of my invention illustrated in Fig. 4 is similar to that shown in Fig. 2 except that it includes the use of reactance elements 23 instead of resistance elements such as those shown at 20 in Fig. 2. Switches 24 are provided for cutting the reactance elements in and out of circuit. The switches 7 may be used as previously described for the purpose of interrupting the parallel connection and the winding sections 6 and the winding sections 5, and it will be understood that the reactance elements 23 may be included in the primary circuit either with the winding sections 6 and 5 connected in parallel, or with the winding sections 6 disconnected from the winding sections 5.

Figure 5:
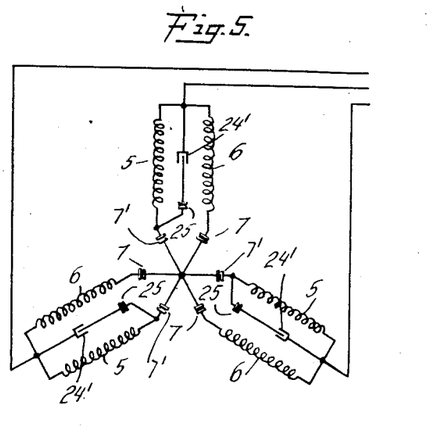

In Fig. 5, I have illustrated an embodiment of my invention similar to that shown in Fig. 1, except for the addition of condensers 24' adapted to be connected across one or both of the winding sections of each phase. Switches 25 are provided for controlling the connection of the condensers and switches 7 and 7' are provided for controlling the connection of the winding sections 5 and 6. With this arrangement winding sections 5 may be used as transformers connected across the condensers for improving the power factor and reducing the KVA and in this event the switches 7 may be permitted to remain closed at all times, or may be omitted from the circuit. With the switches 7 closed and with the switches 7' open during the initial portion of the starting period the winding sections 5 carry a current induced from the winding sections 6 provided the switches 25 are closed. Under these conditions the condensers supply the necessary magnetizing current for the motor with the result that less current will be drawn from the line by the winding sections 6. In this way the KVA drawn from the line may be reduced, the current being divided between the two sets of winding sections and the heat generated by the starting current will likewise be distributed throughout all portions of the primary winding.

The arrangement of Fig. 5 may also be utilized by leaving the switches 7' closed and opening switches 7 during the initial portion of the starting period but in this event the heat generated in the winding sections 6 will be greater.

In Figs. 2, 3, 4 and 5, I have not illustrated any secondary winding but it will be understood that these embodiments of the invention may include any or all of the secondary circuit features illustrated in Fig. 1. In fact the invention is not limited to any particular construction of the motor secondary. The invention may be applied to synchronous motors and also to induction machines. For the sake of convenience of description and illustration three phase, star-connected primary windings have been considered but it will be understood that the invention is equally applicable to any multiple circuit, polyphase, star or delta connected winding.

Figure 8:
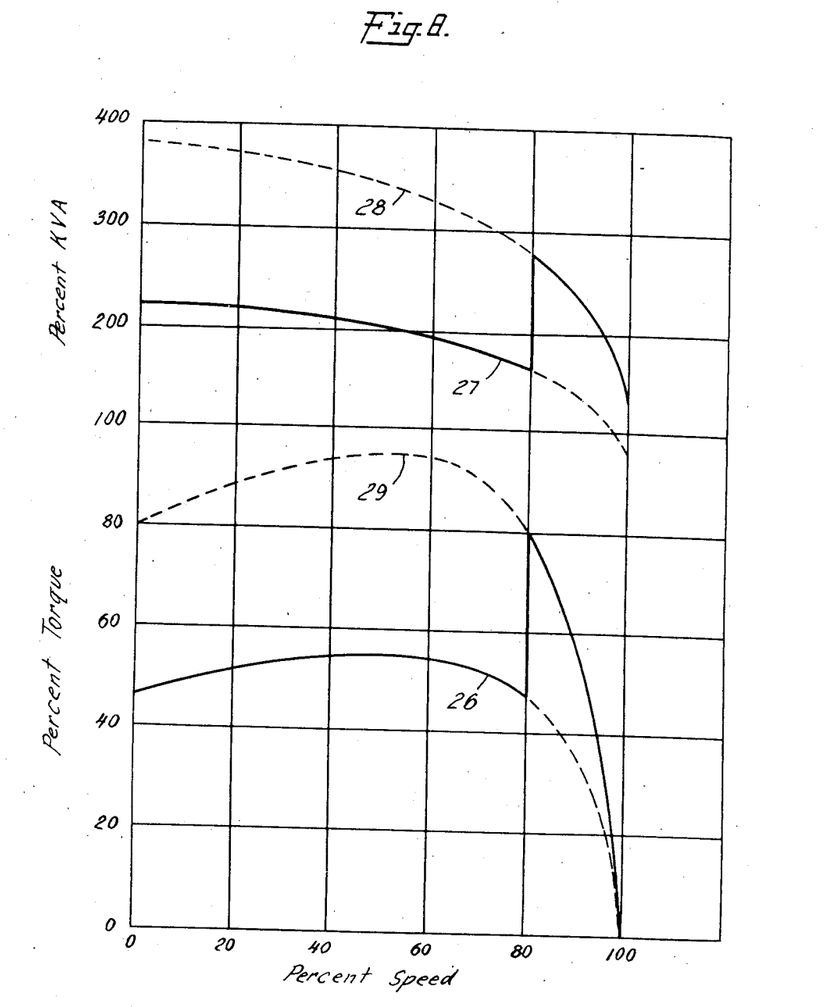
Figs. 8 and 9 are charts illustrating the KVA and torque developed by motors embodying the present invention.

In Fig. 8, I have illustrated typical results obtained by employing the present invention. This figure comprises a chart showing the starting KVA and starting torque of a motor embodying my invention. The full line curve 26 represents the per cent of full load torque developed during the starting period and the full line curve 27 represents the per cent KVA from the line. If I regard this chart of Fig. 8 as representing the conditions resulting from the use of the invention as illustrated in Fig. 1 for example, the initial portion of the torque curve 26 represents the torque developed by the motor while the switches 7 are open. The vertical portion of this torque curve represents the sudden increase in torque taking place when the switches 7 are closed. In like manner the initial portion of the KVA curve 27 represents the KVA developed while the switches 7 are open and it will be noted that when these switches are closed at 80 per cent speed the KVA suddenly rises. The chart of Fig. 8 clearly shows the utility of the present invention for, if the motor were started with the switches 7 closed, then the KVA curve would be as indicated in dotted lines at 28 and the torque would be as indicated by the dotted curve 29. The curves of Fig. 8 illustrate a type of low speed synchronous motor such as might be used to drive a compressor and it will be understood that the figures at the lefthand vertical scale are given merely for illustrative purposes and do not represent torque and KVA values for all synchronous motors. In the case of a synchronous motor good pull-in torque can be obtained by closing the switches 7 when synchronous speed is approached and this result can be accomplished without drawing excessive current from the line. As illustrated in Fig. 8 the closing of the switches 7 at 80 per cent speed does not cause the KVA to increase to a value at all comparable to what it would have been during the initial portion of the starting period if the switches 7 had been closed throughout the entire starting period.

Figure 9:
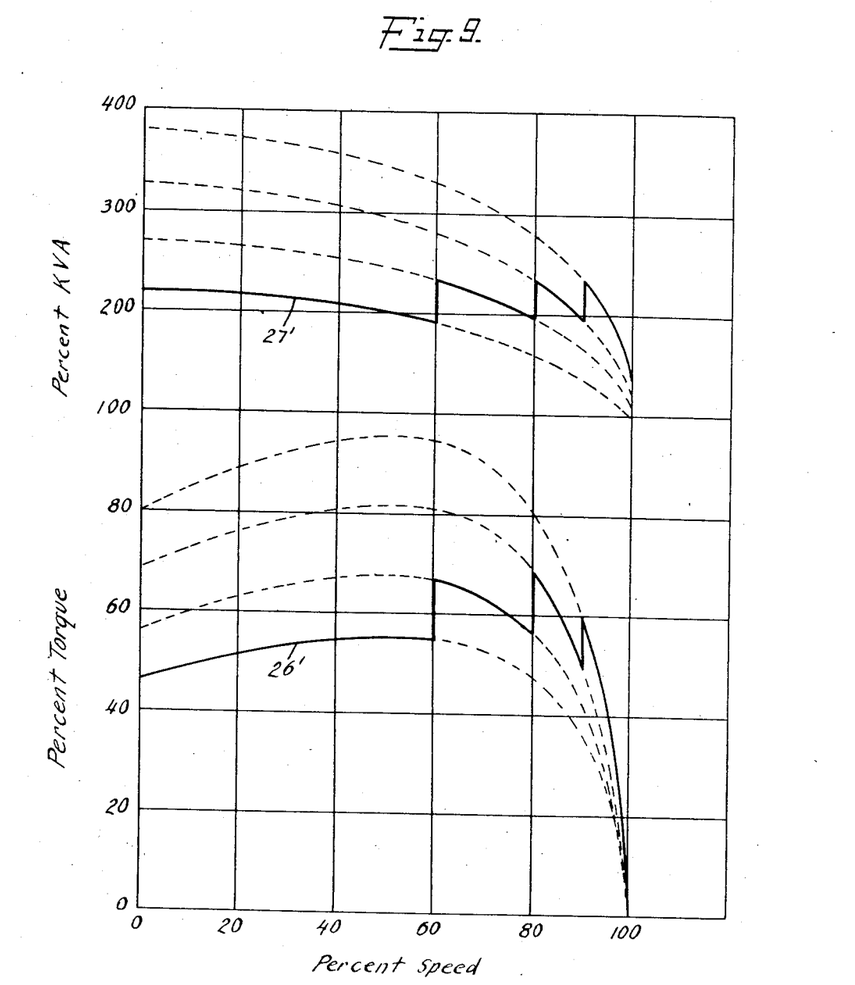

In Fig. 9, I have illustrated curves similar to those shown in Fig. 8 but representing conditions existing when the starting process includes three steps instead of the two steps as represented by the curves of Fig. 8. The full line curves 26' and 27' of Fig. 9 illustrate the possibility of smooth starting as by closing the switches 7 of Fig. 5, for example, in sequence, or by employing a resistance or reactance as previously described.

It is to be understood that my invention is not limited to the particular details illustrated and described but includes such modifications thereof as fall within the scope of the appended claims. For example, I prefer to employ some means for automatically controlling the organization of the primary winding sections during the starting periods, yet the invention can be used to advantage without employing any such automatic means. My improved method is susceptible of a number of variations as to the number of phases reorganized during the starting period and as to the number of steps or stages employed. In some cases it may be desirable to divide the windings of each phase of the primary into several groups as for the purpose of obtaining smoother acceleration and, accordingly, in stating that the primary winding may comprise two winding sections it will be understood that I have reference to primary windings which may include two or more winding sections.

I claim:—

1. The combination of an electric motor having a primary winding comprising two winding sections normally connected in parallel, a secondary winding, and means responsive to the electrical condition of said secondary winding for temporarily interrupting the parallel connection of said primary sections.

2. The combination of an electric motor having a primary winding comprising two winding sections normally connected in parallel, and means responsive to the slip of the motor for temporarily interrupting the parallel connection of said sections.

3. The combination of an electric motor having a primary winding comprising two winding sections normally connected in parallel, and means responsive to the slip of the motor for temporarily increasing the impedance of one of said sections.

4. The combination of an electric motor having a primary winding comprising two winding sections normally connected in parallel, and means for temporarily increasing the impedance of one of said sections, the other of said sections consisting of coils concentrated to provide high reactance.

5. The method of starting a squirrel cage motor having a primary winding comprising two winding sections normally connected in parallel, and a secondary winding arranged to carry an induced current of slip frequency during the starting period, which comprises disconnecting one of said sections from the other section, applying voltage to said other section, and thereafter reconnecting said sections in parallel when a current of a predetermined slip frequency flows in said secondary winding.

6. The combination of a squirrel cage motor having a polyphase primary winding each phase of which comprises two winding sections normally connected in parallel, means for temporarily disconnecting one of said sections from the other section and means for continuously supplying current to said other section at all times during the operation of the motor.

7. The combination of a squirrel cage motor having a polyphase primary winding each phase of which comprises two winding sections normally connected in parallel, means for temporarily increasing the impedance of one of said sections and means for continuously supplying current to the other section at all times during the operation of the motor.

8. In combination, a squirrel cage polyphase motor having a plurality of electrically independent similar phase circuits on its stator, a predetermined number of said circuits being connected in star and the remaining circuits being arranged for connection in open circuit star and in parallel relation with said other circuits, means for supplying alternating current to said predetermined circuits while the remaining circuits are in open circuit star, and means operative in accordance with a predetermined sub-synchronous speed of said squirrel cage for closing the open circuit in said remaining circuits.

9. In combination, a direct current source of supply, a polyphase synchronous motor having a primary member provided with a plurality of electrically independent similar phase circuits and a secondary member including a squirrel cage winding and a direct current exciting winding, means for supplying alternating current to one of said primary circuits while another of said primary circuits is idle, switching means operative in accordance with the speed of said secondary member for connecting said other circuit in parallel relation with said one circuit, and means for connecting said exciting winding to said direct current source.

10. In combination, a direct current source of supply, a polyphase synchronous motor having a primary member provided with a plurality of electrically independent similar phase circuits and a secondary member including a squirrel-cage winding and a direct current exciting winding, a predetermined number of said primary circuits being connected in star and the remaining primary circuits being arranged in open circuit star and for connection with said other stator circuits, means for supplying alternating current to said predetermined primary circuits while the remaining primary circuits are idle, switching means operative in accordance with the speed of said secondary member for closing the open circuit in said remaining primary circuits, and means for connecting said exciting winding to said direct current source.

11. In combination, a squirrel-cage polyphase motor having a primary member provided with a plurality of electrically independent circuits in each of its stator phases and a secondary member, a predetermined number of said stator circuits being connected in star and the other stator circuits having one set of terminals connected to terminals of said predetermined stator circuits and arranged for connection in star with neutral end connections in open circuit, means for supplying alternating current to said predetermined stator circuits, and switching means operative in accordance with a predetermined speed of said secondary member for connecting all of said stator circuits in parallel relation.

12. The combination of a synchronous motor having a single phase field winding, a polyphase primary winding, a plurality of phases of which each comprise two winding sections, means for supplying alternating current to one winding section of each of said phases, switching means for connecting the other sections of said phases to said means for supplying alternating current, means for operating said switching means, means for delaying the operation of said switching means until after current has been supplied to said one section of each of said phases, whereby current is first supplied to one section and then to both sections in parallel relation, a source of excitation current, and means for connecting said source of excitation current to said field winding.

13. The method of starting an electric motor having a polyphase primary winding each phase of which comprises two winding sections, which comprises connecting at least a portion of one of said sections of each phase in series with at least a portion of the other section thereof to form a series circuit for each phase, supplying current to said series circuits, thereafter interrupting said series connections without interrupting the starting current, and then connecting both of said sections of each phase in parallel without interrupting the starting current.

14. The method of starting a squirrel cage motor having a polyphase primary winding, each phase of which comprises two winding sections whereby at least two polyphase circuits are formed, at least one of said circuits being arranged to produce a positive torque sufficient to start the motor from rest at least under no load conditions, and having an impedance higher than that of a plurality of said circuits in parallel, which comprises applying voltage to part of said circuits with the remainder thereof remaining idle throughout at least a portion of the starting period and then connecting all of said circuits in parallel.

15. The combination of a squirrel cage motor having a polyphase winding a plurality of phases of which each comprise two winding sections normally connected in parallel, means for increasing the impedance of one section of each of said plurality of phases and means for continuously supplying current to the other sections thereof at all times during the operation of the motor.

16. The combination of a squirrel cage motor comprising a polyphase primary winding comprising a plurality of winding sections each consisting of coils concentrated to provide high reactance whereby the impedance of one section alone is greater than that of a plurality of said sections in parallel, and starting means for the motor comprising means for supplying current to said section and switching means for connecting another section in parallel with the same, whereby the motor may be started with relatively low starting torque by initially connecting said first section alone to a source of current and thereafter connecting said other section in parallel with the same.

17. The method of starting a squirrel cage motor having a polyphase primary winding each phase of which comprises two winding sections normally connected in parallel which comprises disconnecting one section of each phase from the other section thereof before supplying voltage to the motor, then supplying voltage to said other section alone and thereafter reconnecting said sections in parallel.

18. The method of starting a squirrel cage motor having a polyphase primary winding each phase of which comprises two winding sections normally connected in parallel which comprises increasing the impedance of one section of each phase, applying voltage to the other section of each phase and thereafter reducing the impedance of said first section when the slip of the motor reaches a predetermined value.

19. The combination of an electric motor comprising a polyphase primary winding comprising a plurality of winding sections forming at least two similar polyphase circuits with the impedance of one circuit alone greater than that of both circuits in parallel, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

20. The combination of an electric motor comprising a polyphase primary winding comprising a plurality of winding sections forming at least two similar polyphase circuits distributed in slots with the impedance of one circuit alone greater than that of both circuits in parallel, a secondary member comprising a squirrel cage winding, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

21. The combination of a synchronous motor comprising a polyphase primary winding comprising a plurality of winding sections forming at least two similar polyphase circuits distributed in slots with the impedance of one circuit alone greater than that of both circuits in parallel, a secondary member comprising a squirrel cage winding and a direct current exciting winding and means for energizing said exciting winding, and starting means for the motor comprising means for connecting one of said circuits to a source of polyphase current and switching means for connecting the other circuit in parallel with said first circuit whereby the motor may be started on one circuit with relatively low starting current by initially connecting said first circuit alone to a source of current and thereafter connecting the second circuit in parallel with said first circuit whereby both circuits become energized by said source of current.

22. The combination of an electric motor comprising a polyphase primary winding comprising a plurality of winding sections forming at least two similar polyphase circuits distributed in slots with the impedance of one circuit alone greater than that of both circuits in parallel, a secondary member comprising a squirrel cage winding, a direct current exciting winding and means for energizing said exciting winding during normal operation of the motor, and starting means for the motor comprising means for connecting said field winding in closed circuit, means for connecting one of said primary circuits to a source of polyphase current, and switching means for connecting the other primary circuit in parallel with said first primary circuit, whereby the motor may be started on one primary circuit with relatively low starting current by initially connecting said circuit alone to the source of current and thereafter connecting the second primary circuit in parallel with said first primary circuit whereby both circuits become energized by said source of current.

23. The combination of an electric motor comprising a primary magnetic structure, a polyphase primary winding comprising at least two winding sections on said primary structure forming similar polyphase circuits disposed with respect to each other and to the magnetic structure to provide a reactance of one circuit alone higher than that of both circuits in parallel, and starting means for the motor comprising means for connecting one of said circuits to a source of polyphase current, and switching means for connecting the other circuit in parallel with said first circuit whereby the motor may be started on one circuit with relatively low starting current by initially connecting said first circuit alone to the source of current and thereafter connecting the second circuit in parallel with said first circuit whereby both circuits become energized by said source of current.

In testimony whereof I affix my signature.

RUPERT N. EARLY.